United States Patent [19]

Oishi et al.

[11] Patent Number: 4,689,702
[45] Date of Patent: Aug. 25, 1987

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 599,354

[22] Filed: Apr. 12, 1984

[30] Foreign Application Priority Data

Apr. 13, 1983 [JP] Japan .............................. 58-54018[U]

[51] Int. Cl.⁴ ...................... G11B 15/32; G11B 15/60; G11B 23/08
[52] U.S. Cl. ............................. 360/132; 360/130.21; 242/199
[58] Field of Search ................ 360/132, 130.2, 130.21, 360/130.3, 130.31, 130.32, 130.33; 242/199, 197, 198, 200

[56] References Cited

U.S. PATENT DOCUMENTS

| | | | |
|---|---|---|---|
| 3,826,489 | 7/1974 | Watkins, Jr. | 360/132 |
| 3,934,842 | 1/1976 | Posso | 242/199 |
| 4,079,499 | 3/1978 | Bagozzi | 242/199 |
| 4,126,283 | 11/1978 | Kawachi | 242/199 |
| 4,337,493 | 6/1982 | Kagano | 360/132 |
| 4,392,169 | 7/1983 | Boullart et al. | 360/130.33 |
| 4,506,846 | 3/1985 | Gelardi et al. | 242/199 |
| 4,545,500 | 10/1985 | Yamaguchi et al. | 242/199 |

Primary Examiner—John H. Wolff
Assistant Examiner—Matthew J. Bussan
Attorney, Agent, or Firm—Sughrue, Mion, Zinn, Macpeak, and Seas

[57] ABSTRACT

A magnetic tape cassette intended for applications such as digital recording where extremely tight tolerances are imposed on the amount of widthwise deviation of the tape. A partition member, dividing the cassette into a recording and reproducing region and a tape winding core accommodating region, is molded separately from the two halves of the shell of the cassette. The partition member has a partition wall having guide walls protruding forwardly therefrom symmetrically with respect to the center line of the cassette. The pair of guide walls closest to the center line have front portions of reduced height so that the upper and lower portions thereof do not contact the cassette halves.

4 Claims, 4 Drawing Figures

MAGNETIC TAPE CASSETTE

BACKGROUND OF THE INVENTION

The present invention relates to magnetic tape cassetes.

Heretofore, magnetic tape cassettes have been formed by combining upper and lower halves. In recording or reproducing signals, a magnetic tape wound on a pair of cores is run along the opening which is formed in the front side wall of the cassette, while being in contact with the magnetic head which extends into the opening.

If the upper and lower halves of the cassette are poor in flatness, then the perpendicularity of a guide member protruding into the cassette to guide the running of the tape is lowered, or the tape is shifted in its widthwise direction by the eccentricity of the winding cores. Thus, it is difficult to guide the tape correctly to the magnetic head; that is, the electromagnetic conversion characteristic is lowered.

For instance in a recording method using a PCM (pulse code modulation) digital audio system in which the displacement of the tape in its widthwise direction is strictly limited to record digital signals with high density, signals are recorded on the tape in multi-track manner. For this purpose, a system in which twenty to thirty-six tracks are formed on a tape for recording audio signals has been proposed. (Only four tracks are formed on a tape having the same width for recording stereo signals in the conventional analog system.) In the PCM system, signals are thus recorded on the tape with high density, for instance, with a track width of 100 $\mu$m and an effective track pitch of 100 $\mu$m. Accordingly, if the tape is displaced in its widthwise direction even slightly with respect to the magnetic head, then in recording or reproducing signals the same tracks are not traced. That is, a tracking error is caused, and it becomes considerably difficult to use different recording and reproducing apparatuses alternately in such a manner that signals are recorded by one of the apparatuses and are reproduced by another. In order to solve this problem, it is essential that the cassette have an excellent flatness property.

A magnetic tape cassette is well known in the art in which, in order to improve the flatness of the cassette, in place of the usual partition wall molded integrally with one of the upper and lower halves in such a manner as to protrude from the inner surface of the bottom of the half thereby to divide the hollow inside of the cassette into two parts, a partition wall is detachably arranged in the cassette (see Japanese Laid-Open Pat. Application No. 131817/1978).

That is, the halves, from which the partition wall for dividing the hollow inside of the cassette into a relatively small recording and reproducing region provided near the front opening of the cassette and a tape winding core accomodating region which is relatively large in area and is located behind the recording and reproducing region is formed, are molded so that the halves can be more accurately molded. The magnetic tape cassette is formed by fitting the partition wall between the halves.

A partition member is formed by extending pairs of guide walls from the front side of the partition wall.

The guide wall are so formed that they are perpendicular to the inner surfaces of the bottoms of the upper and lower halves, and the front ends thereof are used to guide the tape.

In the cassette designed as described above, the molded upper and lower halves are highly flat and the tape running characteristic is satisfactory.

However, the above-described cassette is disadvantageous in that, since the cassette has a plurality of openings in the front side wall the corresponding part of the metal mold must be of a so-called liner structure consisting of a number of blocks. Because of the structure of the metal mold, it is impossible to uniformly eject and cool the plastic resin. Especially the front parts of the halves are liable to be strained by molding, thus causing the halves to be somewhat poor in flatness.

The partition member having the partion wall is arranged near the front side wall of the cassette in such a manner that the top and bottom of the partition member are in close contact with the bottoms of the front parts of the upper and lower halves. Accordingly, when the upper and lower halves are combined together with screws, the partition member is affected directly by the strain of the upper and lower halves, as a result of which the perpendicularity of the partition member is lowered.

As the perpendicularity of the partition member is lowered, the perpendicularity of the protruding guide walls is also lowered. Accordingly, the tape, being supported by the front ends of the protruded guide walls, is run unstably.

An object of the invention is to provide a cassette in which the above-described difficulties accompanying a conventional cassette have been eliminated and which has partition member allowing the tape to run satisfactorily.

SUMMARY OF THE INVENTION

The foregoing object and other object of this invention have been achieved by the provision of a magnetic tape cassette comprising upper and lower halves in pairs; and a partition member formed by molding, as one unit, guide walls protruding near the front opening which is formed by combining the upper and lower halves together and a partition wall, in which, according to the invention, the partition wall has a plurality of guide walls protruding from inside the cassette towards the front side of the cassette in such a manner that the guide walls are arranged symmetrically with respect to the center line of the partition wall, and at least one pair of guide walls closest to the center line of the partition wall have front end portions made narrower in width so that the upper and lower edges thereof are not in contact with the inner surfaces of the bottoms of the upper and lower halves.

DESCRIPTION OF THE PREFERRED EMBODIMENTS

An example of a magnetic tape cassette according to the invention will be described with reference to the accompanying drawings.

Figure 1:
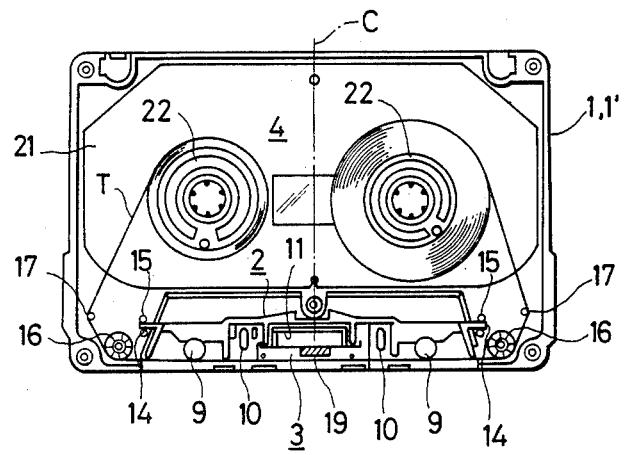
FIG. 1 is a plan view outlining the arrangement of a magnetic tape cassette according to the invention.

FIG. 1 is a plan view of a cassette according to the invention. As shown in FIG. 1, the hollow inside of the cassette which is formed by combining the upper and lower halves 1 and 1' is divided into two regions by a partition member 2 which is detachably mounted.

Figure 2:
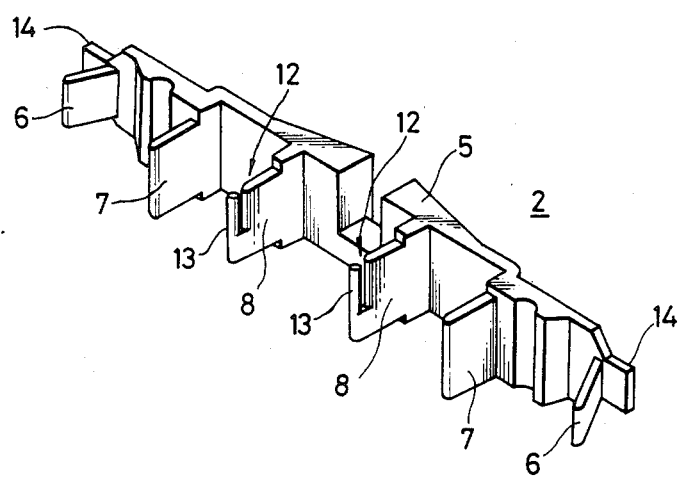
FIG. 2. is a perspective view of a partition member in the cassette of FIG. 1.

The partition member 2, as shown in FIG. 2, has a partition wall 5 which divides the hollow inside of the cassette into a recording and reproducing region 3 and a tape winding core accomodating region 4, and plural pairs of protruding guide walls 6, 7 and 8 which extend from the front side of the partition wall 5 towards the recording and reproducing region 3.

The pairs of guide walls 6, 7 and 8 protrude symmetrically from the partition wall 5 in such a manner as to define areas for a pair of capstan inserting holes 9, a pair of positioning holes 10, and a shield plate 11 in the recording and reproducing region 3.

Figure 3:
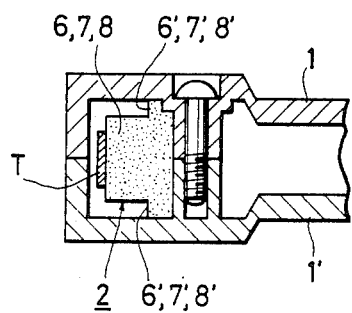
FIG. 3 is a cross-sectional view showing a part of the cassette of the invention.

FIG. 3 is a cross-sectional view outlining a part of the cassette according to the invention. The guide walls 6, 7 and 8 have front portions made narrower from near the base to the end, having small steps 6', 7' and 8'. Therefore, when the partition member 2 is arranged between the upper and lower halves 1 and 1', the front portions of the guide walls are not in contact with the inner surfaces of the upper and lower halves 1 and 1'; that is, there are small gaps between the front portions of the guide walls and the inner surfaces of the upper and lower halves of the cassette.

Among the pairs of guide walls 6, 7 and 8, the pair of guide walls 8 is closest to the center of the partition wall 5. Vertical slits 12 are cut in the end portions of the guide walls 8 to form guide poles 13 and 13 at the outermost ends.

Both end portions 14 of the partition wall 5 are made narrower with steps, and extend to engage respective locking members 15 (described later).

The upper and lower halves 1 and 1' are molded so that the recording and reproducing region 3 of relatively small area which occupies the front part of the cassette and the winding core accommodating region 4 of relatively large area which occupies the rear part of the cassette are defined by the partition member 2 and the inner surface of the bottom for a part of the winding core accommodating region 4 and the recording and reproducing region 3 is slightly lower than the inner surface of the bottom for the other part of the winding core accommodating region 4.

A pair of rotary guide rollers 16 and a pair of stationary guide poles 17 are arranged symmetrically with respect to the center line C on the inner surface of the bottom of the winding core accommodating region 4 and near the front part of the cassette.

The locking members 15 have vertical slits 18 for engagement of the partition member 2 and are provided in the winding core accommodating region 4 between the rotary guide rollers 16 and the recording and reproducing region 3.

The locking members 15 extend vertically from the inner surfaces of the bottoms of the upper and lower halves 1 and 1'. The two end portions 14 of the partition member 2 are inserted into the corresponding vertical slits 18 of the locking members so that the partition member 2 is positively held thereby.

Figure 4:
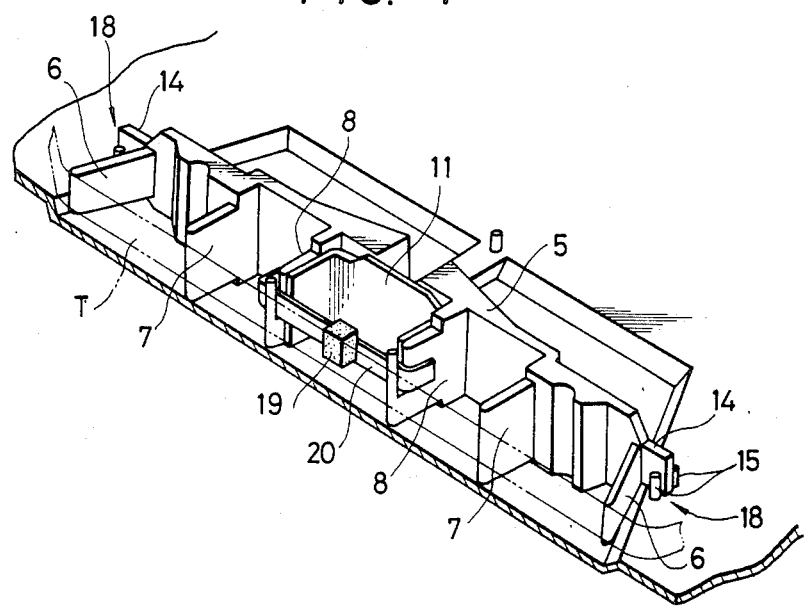
FIG. 4 is a perspective view showing essential components of the cassette according to the invention.

FIG. 4 shows the arrangement of the partition member 2 according to the invention, a shield plate 11, and a pressurizihg plate 19 and a leaf spring 20 which is combined with the shield plate 11.

As in the conventional cassette, the shield plate is U-shaped. Both end portions of the U-shaped shield plate 11 extend to the vertical slits 12 cut in the front end portions of the guide walls 8 and are set on the inner surfaces of the guide walls which confront each other.

The two bend end portions of the leaf spring 20 with the pressurizing pad 19 are inserted into corresponding ones of the vertical slits 12 in such a manner that they are on the outer surfaces of the guide walls 8 and extend rearwardly.

The procedure of assembling the cassette thus constructed will be described. First, a friction sheet 21 and the rotary guide rollers 16 are set in place on the inner surface of the bottom of the lower half 1'. Then, the two end portions 14 of the partition wall 5 of the partition member 2 are inserted into the vertical slits 18 of the locking members 15, respectively.

Thereafter, the shield plate 11 and the leaf spring 20 with the pressurizing pad 19 are combined with the partition member 2. Then, the tape T wound on the winding cores 22 is laid over the outermost ends of the guide walls 6, 7 and 8 while being extended along the predetermined tape running path. The upper half 1 is placed on the lower half 1', and, under this condition, the upper and lower halves 1 and 1' are combined together with screws. Thus, the cassette has been assembled.

In the cassette thus assembled, the hollow inside thereof is positively divided into the recording and reproducing region 3 and the winding core accomodating region 4 by the partition member 2, and small gaps are formed between the upper and lower edges of the guide walls 6, 7 and 8 and the inner surfaces of the bottoms of the upper and lower halves 1 and 1'.

In the cassette according to the invention, the partition member 2 for partitioning the hollow inside of the cassette is molded independently of the upper and lower halves 1 and 1'. Accordingly, the upper and lower halves 1 and 1' are improved in flatness. In addition, in the partition member 2, the area of the contact surfaces which are brought into contact with the inner surfaces of the bottoms of the upper and lower halves 1 and 1' is reduced. Therefore, even if the upper and lower halves 1 and 1' have strain, the effect of the strain is minimized.

That is, the front end portions of the protruding guide walls 6, 7 and 8, which greatly affect the tape running characteristic, are made smaller in width having the steps on the upper and lower edges, so that they are not in contact with the inner surfaces of the bottoms of the upper and lower halves.

With the cassette according to the invention designed as describe above, when the upper and lower halves 1 and 1' are combined together, the partition member 2 substantially eliminates the effects of the strain and deformation of the upper and lower halves 1 and 1' and it is suitably held upright. Thus, the tape running characteristic of the cassette is stable.

In the above-described cassette, all the protruding guide walls 6, 7 and 8 are made smaller in width at the front end portions; however, the object of this invention can be achieved by employing only the protruding guide walls 8 which are closest to the center line of the partition member and are thus most effective in guiding the tape correctly to the magnetic head made narrower in width at the front end portion, having the steps on the upper and lower edges.

The cassette of the invention is effectively employed especially for digital audio sytems; however, it goes without saying that it may be employed for analog recording operations with satistactory results.

We claim:

1. In a magnetic cassette including an upper half, a lower half (1'), and a molded partition member (2) comprising guide walls and a partition wall formed separately from said upper and lower halves, said guide walls extending outwardly from said partition wall towards a front cassette wall opening formed by assembling said upper and lower halves together with said partition member interposed therebetween, the improvements wherein:

(a) said partition wall (5) has a plurality of guide walls (6,7,8) extending outwardly therefrom inside said cassette towards said front cassette wall in such a manner that said guide walls are arranged symmetrically with respect to and on opposite sides of a center line of said partition wall extending substantially perpendicular to said front cassette wall, and (b) at least one pair (8) of said guide walls disposed closest to and flanking the center line of said partition wall have outward end portions of reduced height defined by recessed upper and lower edges thereof such that said upper and lower edges are spaced from inner surfaces of said upper and lower halves upon assembly.

2. The magnetic cassette according to claim 1, further comprising a leaf spring (20) supported by said one pair of guide walls adjacent said front cassette wall opening, and wherein each outward end portion of said one pair of guide walls closest to said center line of said partition wall has a vertical slit (12) formed therein to define a guide pole (13), said vertical slit having a depth at least equal to a vertical height of said leaf spring.

3. The magnetic cassette according to claim 1, wherein said upper and lower halves are provided with pairs of locking members (15), and opposite ends (14) of said partition wall are narrowed in steps to engage respective ones of said locking members.

4. The magnetic cassette according to claim 1, further comprising a pair of rotary guide rollers (16) and a pair of stationary guide poles (17) arranged symmetrically with respect to said center line in a winding core region of said cassette.

* * * * *